UNITED STATES PATENT OFFICE.

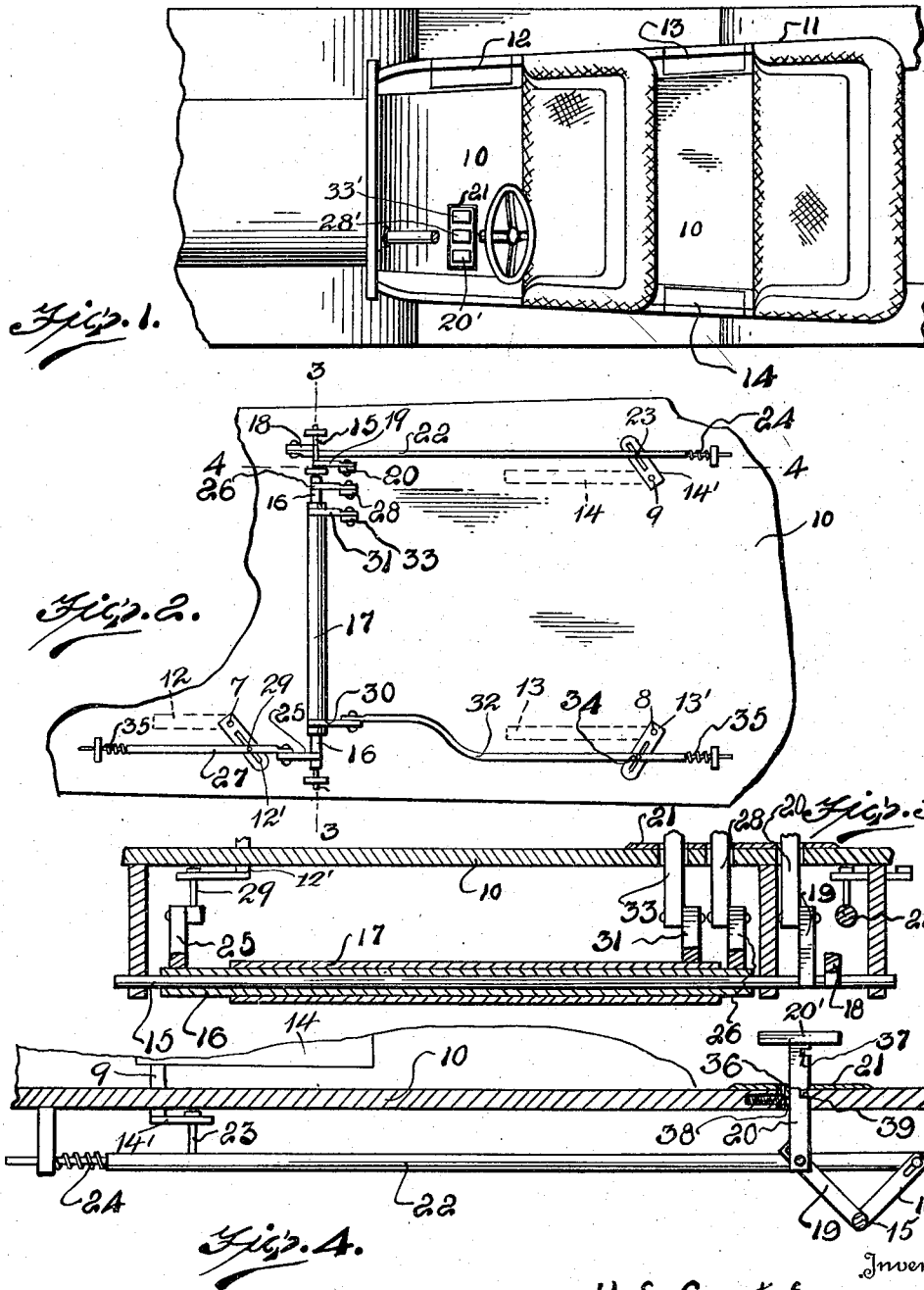

HAROLD E. GUSTAFSON, OF HARCOURT, IOWA.

AUTOMOBILE-DOOR-OPERATING MECHANISM.

1,218,645.      Specification of Letters Patent.      Patented Mar. 13, 1917.

Application filed October 5, 1915.   Serial No. 54,220.

*To all whom it may concern:*

Be it known that I, HAROLD E. GUSTAFSON, a citizen of the United States, residing at Harcourt, in the county of Webster, State of Iowa, have invented certain new and useful Improvements in Automobile-Door-Operating Mechanism; and I do hereby declare the following to be a full, clear, and exact description of the invention, such as will enable others skilled in the art to which it appertains to make and use the same.

This invention relates to improvements in automobiles, and particularly to door openers and closers therefor.

The principal object of the invention is to provide a novel means for opening and closing the doors of an automobile with the foot.

Another object is to provide a novel foot operated mechanism which will automatically lock at both limits of its movement whereby the door or doors can be held in open or closed position.

Other objects and advantages will be apparent from the following description when taken in connection with the accompanying drawing.

In the drawing:

Figure 1 is a plan view of a portion of an automobile equipped with my door opening and closing mechanism;

Fig. 2 is a bottom plan view;

Fig. 3 is a transverse section on the line 3—3 of Fig. 2; and

Fig. 4 is a longitudinal section on the line 4—4 of Fig. 2.

Referring particularly to the accompanying drawing, 10 represents the floor of the automobile, and 11 the sides thereof. At the proper points there are mounted the swinging doors 12, 13 and 14. Carried by the hinge side of the doors respectively are the angularly extending and slotted extensions 12', 13' and 14', said extensions being carried by rigid pins 7, 8 and 9 projecting downwardly from the lower edges of the doors in alinement with their hinge axes. Extending transversely beneath the forward portion of the floor is a shaft 15 on which are concentrically mounted the hollow shafts 16 and 17. On one end of the shaft 15 there are formed radially extending arms 18 and 19, the latter of which has connected therewith the lower end of a pedal plunger 20, having a pedal 20' at its upper end which extends up through an opening in a plate 21 secured to the floor of the car. To the other arm is pivotally connected one end of a rod 22 which extends longitudinally under the floor to a point adjacent the hinge side of the door 14, where it is provided with a laterally extending pin 23 which is engaged in the slot of the member 14'. The terminal end of the rod 22 has connected to it one end of a spring 24 which is secured to the floor of the car, said spring being adapted to move the rod longitudinally into normal position to move the door into open position. On the respective ends of the shaft 16 are formed the radial arms 25 and 26, the same being pivotally connected respectively to a rod 27 and to a pedal plunger 28 which carries the pedal 28'. The said rod extends to a point adjacent the hinge end of the door 12, where it is provided with a pin 29 engaged in the slot of the member 12'. At the respective ends of the shaft 17 are the arms 30 and 31 which extend radially from the shaft and are pivotally connected respectively to one end of a rearwardly extending rod 32 and a plunger 33 at whose upper end is the pedal 33'. This rod is provided, on its rear end, with a pin 34 engaged in the slot of the member 13'. Each of the rods 27 and 32 is connected with a spring 35, which is similarly disposed to the spring 24, and has a like function. Each of the pedal plungers is formed with a notch 36 in its upper portion, and a notch 37 in its lower portion. Mounted at one side of each of the plungers is a spring-pressed block 38 which bears against the plunger so that it pushes the plunger against the opposite side wall of the opening. A lug 39 is carried by this other side of the opening and is arranged to engage in the lower notch of the plunger, when the plunger is elevated, to hold the plunger in such position, and also to engage in the upper notch to hold the plunger in depressed position. The openings through which the plungers are passed are sufficiently large to permit of a rocking movement of the plunger against the spring-pressed block to disengage the plunger from the lug.

It will be apparent from the foregoing description that it is possible for the driver of the car to which my invention is applied to open any one of the doors without leaving his seat, or using his hands. When any one of the doors is to be opened, the operator depresses the corresponding pedal 20', 28' or 33' with the result that one of the rotary elements 15, 16 or 17 is actuated through the medium of the corresponding connecting arms 19, 26 and 31. Thus, if the shaft 15 is rotated by the depression of the pedal 20', the rod 22 will be projected rearwardly against the pressure of the spring 24. This action causes the element 14' to be swung rearwardly through the action of the pin 23 in the slot formed in said element. Since the pin 9 is rigid to both the element 14' and the door 14, the door is carried with the element 14', and is held in open position until the pedal 20' is released. The spring 24 then acts to return all of the parts to normal position including the door 14, which obviously assumes its closed position. The other doors are opened and closed in an obviously corresponding manner.

What is claimed is:

1. A door operating mechanism for automobiles comprising in combination, a plurality of transverse shafts carried by the body of the automobile, pedals operatively connected to said shafts for individually rotating the latter, a longitudinally extending rod connected to each of said shafts to be longitudinally moved when the shafts are rotated, a slotted arm rigidly carried by each of the doors of the automobile and extending across the corresponding rod, a pin carried by each of the rods and engaging with the corresponding slotted arm, the longitudinal movement of the rod sliding said pin in the slot of said arm so that the latter is swung to open the door, and resilient means for holding the parts in normal position and acting against the operation of said pedals.

2. A door operating mechanism for automobiles comprising in combination, a plurality of transverse shafts carried by the body of the automobile, pedals operatively connected to said shafts for individually rotating the latter, a longitudinally extending rod connected to each of said shafts to be longitudinally moved when the shafts are rotated, a slotted arm rigidly carried by each of the doors of the automobile, a pin carried by each of the rods and engaging with the corresponding slotted arm, resilient means for holding the parts in normal position and acting against the operation of said pedals, and means for locking the pedals in elevated or depressed position.

In testimony whereof, I affix my signature, in the presence of two witnesses.

HAROLD E. GUSTAFSON.

Witnesses:
 OSCAR T. SWANSON,
 HENRY J. PETERSON.